May 20, 1941.                G. G. ERDOS                2,242,779
                    DISHPAN WITH REMOVABLE HANDLES
                         Filed Sept. 27, 1939
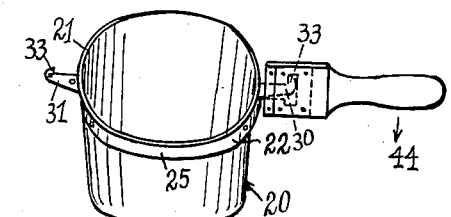
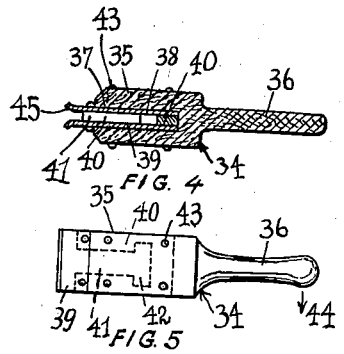
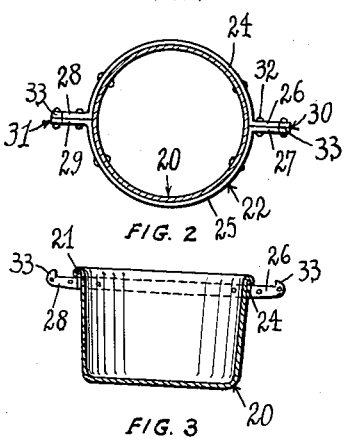
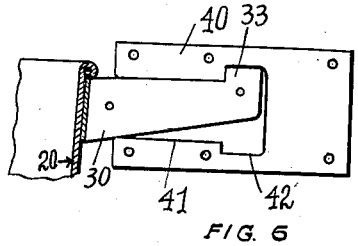
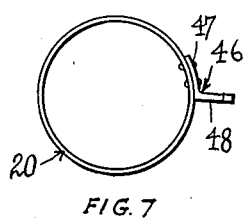
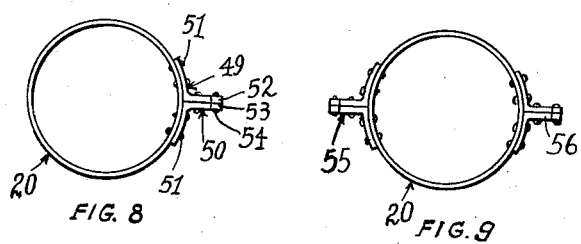
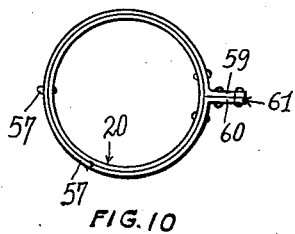
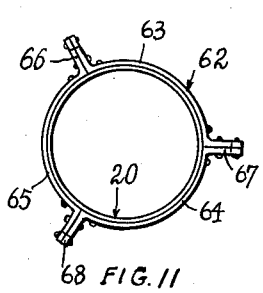
GEORGE G. ERDOS,
INVENTOR,
BY Julian J. Wittau
his ATTORNEY.

Patented May 20, 1941

2,242,779

UNITED STATES PATENT OFFICE 2,242,779

DISHPAN WITH REMOVABLE HANDLES

George G. Erdos, Astoria, Long Island, N. Y.

Application September 27, 1939, Serial No. 296,765

17 Claims. (Cl. 53—8)

This invention relates to cooking utensils or dishes of certain types, like pots and pans, and has for its main object to provide removable handles for the same being of a novel and efficient construction.

As it is well known such cooking utensils are generally made of sheet metal, like aluminum or enamelled steel, and are generally provided with long handles made of similar materials for lifting and moving the utensil and its contents.

It is also well known that such handles are rather awkward and cumbersome, they get overheated, they are in the way when several such utensils are on a stove or the like, they may easily upset the balance of the utensil.

The main object of my invention is to provide a reinforced construction for such utensils which may be used as a support for removable handles, to eliminate the objectionable long permanent handles, and to provide a removable safe lifting handle of a novel design with a novel principle of operation normally removed from the utensil and applied thereto only when it is needed.

Other objects of this invention will be apparent as the specification of the same proceeds, and among others I may mention: to provide a device as characterized hereinbefore which will be simple in construction, inexpensive to manufacture, adapted to mass-manufacturing, easy to apply to pots and pans of the present shape, durable and reliable, and in which one handle may be applied to any number of such cooking utensils.

In the drawing forming a part of this specification, and accompanying the same:

Fig. 1 is a perspective view of a cooking pot or pan to which my removable handle has been applied;

Fig. 2 is a partly sectional plan view of the same, the handle having been removed, and Fig. 3 is a central sectional elevation;

Fig. 4 is a sectional view of a removable handle used with my improved pans or pots, portions of the same being shown in sections, and Fig. 5 is a side elevation thereof, while Fig. 6 shows the central plate in said removable handle, on a greatly enlarged scale, indicating its cooperation with an extension on the pot or pan;

Fig. 7 is a semi-diagrammatical plan view of a pot or pan to which a modification of my supporting extension has been applied, generally being in the form of an angular iron, while Fig. 8 is a similar view of another modification, in which the extension is formed of two such irons, and Fig. 9 shows still a further modification having two extensions each formed of two such irons;

Fig. 10 shows a further modification in which a reinforcing ring forms a single support extension for the dish or pan, and Fig. 11 shows such a modification wherein several supporting extensions are formed by portions of a reinforcing ring.

Referring now to the drawing more closely by characters of reference, the numeral 20 indicates a pot or pan in general, which in the preferred embodiment of my invention shown in Figs. 1, 2 and 3, has a curled or tubular upper marginal edge 21 under which is secured thereon a reinforcing ring 22 by any appropriate means like the rivets 23 or by welding, etc. Ring 22 is in this embodiment formed of two half rings 24 and 25, respectively, having the cooperating radial extensions 26 and 27, and 28 and 29, respectively. These extensions or terminal flanges on the semi-circles 24 and 25 are cooperating with one another and jointly forming the radially opposite handle support extensions or ears 30 and 31, the respective flanges or extensions 26 and 28, and 27 and 29, respectively, being united and secured to one another by appropriate means as by rivets 32. Each handle support or ear 30 and 31 is provided with an appropriate projection or tooth 33 at its outer end for the purpose to be described presently.

The removable handle for my invention is indicated in its preferred embodiment, in Figs. 4 to 6, and it comprises a handle proper 34 of the design shown and of any appropriate material as wood, composition, metal, etc., and has a generally rectangular front portion 35 and a shaped handle or rear portion 36 which may be circular in cross sections or may be somewhat flattened in the plane of Fig. 5 to facilitate its ready application on the ears 30 and 31, as will be obvious. The front portion 35 of the handle 34 is fork shaped, and has a central preferably through going slot or opening 37 therein, into which is secured a right hand plate 38, a left hand plate 39 and a central plate 40 snugly fitting between the two. The central plate 40 is somewhat shorter than the slide plate 38 and 39, as shown in Figs. 4 and 5, and the central portion thereof is removed showing the slot 41 with an enlarged transverse recess 42 for the same. Plates 38, 39 and 40 are secured in the slot 37 of the front part 35 of the handle by any appropriate means as by the rivets 43.

The use and application of my removable handle will be obvious from the drawing, and from the herein description, still I want to briefly explain the same as follows:

When it is desired to use the pot or pan 20, the handle 34 will be applied on one of the ears 30 or 31 by pushing the slot 41 thereover and permitting the tooth 33 to catch in the transverse extension 42 of said slot, as best indicated in Fig. 6. When lifting the pot or pan, particularly if the same is filled, the pot or pan will gravitate downwardly and will cause the ears 30 or 31 to take the position indicated in Fig. 6 wherein the tooth 33 is caught in the transverse slot 42. When, however, the pot or pan is placed where desired, my removable handle 34 will drop downwardly by its own weight, as indicated by the arrows 44 in Figs. 1 and 5, and may easily be removed from the ear 33.

It will be seen that in the embodiment shown in Figs. 1 to 6, my symmetrical handle 34 may be easily applied to either ears 30 or 31, and there is no need to look for the right position thereof, since it may be applied to either ears in either positions thereof in which the slot 41 may be pushed over the respective ear.

To facilitate the application and the removal of the handle, the side plates 38 and 39 may have bellmouthed, flared front portions as indicated at 45.

In Fig. 7, a very simple application of my invention is indicated wherein the pot or pan 20 has an angular iron 46 secured thereon by its arcuate branch 47, while a straight branch 48 thereof constitutes the ear for the pan 20, being formed similarly to the ear 30 or 31.

In Fig. 8, the simple form of 7 is followed, but two angle irons 49 and 50 are applied opposite each other and being secured on the pan 20 by the rivets 51, while their projecting flanges 52 and 53 are secured to one another by the rivets 54 to form a supporting ear for the pan, as will be understood.

In Fig. 9, the construction of Fig. 8 is repeated at two diagrammatically opposite sides of the pan 20 forming two opposite ears 55 and 56.

In the embodiment shown in Fig. 10, a ring 57 is formed around the upper part of the pan 20 and secured thereon as by a tight fit, or by the rivets 58, the open end of the ring terminating in transverse projections 59 and 60 which secured to one another to form an ear 61 of a similar construction to those described hereinbefore.

In Fig. 11, a reinforcing ring 62 is formed on the pan 20 by three portions 63, 64 and 65 respectively, the lateral terminal extensions of which secured to one another form three supporting ears 66, 67 and 68 to be used with my novel handles.

Referring as an example to Figs. 1 and 2, I prefer to manufacture my device in such a manner that the ring 22 will be pushed up against the bead 21 so that the bead will carry the weight, and if rivets are provided, they primarily are only to secure the ring in its place. This will eliminate the usual trouble that such rivets or other securing means may tear or become loose after prolonged use.

What I claim as new, is:

1. In a pot or the like, a substantially radial projection, a removable handle, said handle having a hole therein adapted to receive said radial projection and substantially embrace it on all sides for lifting or supporting the pot or the like.

2. In a pot or the like, as set forth in claim 1, means in said hole to secure said projection therein through the weight of the said pot or the like, when the same is supported by it.

3. In a pot, pan and the like, a substantially radial ear, a removable handle, a hole in the handle adapted to receive said ear and substantially embrace it on all sides, a projection on said ear, and a shoulder in said hole adapted to engage said projection, when it is desired to secure the handle, or to disengage it, when it is desired to remove the handle from the ear.

4. In a pot, pan and the like, a plurality of substantially radial ears, a removable handle for said ears, a hole in said handle adapted to receive any of said ears, a projection on each ear, and a shoulder in the hole in said handle adapted to engage said projection when the weight of the pan is active, or to be disengaged when said weight is inactive.

5. For a pot, pan, and the like, having a supporting ear, a removable handle having a plate secured into its front end, an angular slot in said plate, having a transverse branch and an open end permitting said ear to enter the slot, a projection on said ear, said projection being adapted to be removably secured in the transverse branch of said angular slot.

6. In a removable handle, as set forth in claim 5, said slot being T-shaped and said projection being adapted to be engaged in either one of the two transverse extensions of the T-shaped slot.

7. For a pot, pan and the like, having a supporting ear, a removable handle, three plates secured in the front part of said handle in side by side relation, the middle one of said plates having a slot adapted to receive said ear.

8. In a removable handle as set forth in claim 7, the front ends of the outer plates, adjacent to the opening of said slot being outwardly bent to form a flared entrance for said slot.

9. In a pot or the like, a handle element being in the form of a ring encircling the pot, said ring having closely adjacent terminations, the ends of the material of the ring at said terminations being turned into a substantially radial pair of united projections, being in the form of generally vertical plates of doubled thickness when the pot or the like is in its normal resting position.

10. In a pot or the like, a supporting element permanently secured on said pot or the like, said element having a portion circumferentially engaging said pot, and another portion radially projecting from said first portion and a hollow removable handle member adapted to be pushed over said projecting part when it is desired to raise said pot.

11. In a device as set forth in claim 10, said projecting part being substantially a vertical plate when the pot is in its normal position, and said handle having a vertical narrow slot to receive said plate projection.

12. In a device as set forth in claim 10, said first part fully encircling said pot.

13. In a device as set forth in claim 10, said projecting part being substantially a vertical plate when the pot is in its normal position, and said handle having a vertical narrow slot to receive said plate projection, and inter-locking portions between said vertical plate and said handle active when the weight of the pot is exerted on the handle.

14. In a device as set forth in claim 10, an ear on said projecting part adapted to inter-lock with a portion of said hollow handle when the weight of the pot is active on the handle and being adapted to be disengaged therefrom when the weight of the pot is released from the handle.

15. In a device as set forth in claim 10, a plurality of supporting elements, their projecting portions being placed side by side and secured to one another, each such pair of secured projections being adapted to be engaged by said hollow handle.

16. In a pot or the like, a bead in the upper portion of said pot, a ring snugly engaging said pot and being pushed upwardly against said bead, radial projections on said ring and a removable hollow handle adapted to engage any of said projections for raising the pot.

17. In a pot or the like, a ring embracing said pot and being secured thereon, said ring being formed of a plurality of sections, each section having radially projecting vertical plate formed extensions at its ends, the adjacent radial projections on said sections being secured to one another to form projections on said pot of doubled thickness, and a removable hollow handle having a slot shaped hole therein, adapted to receive any of said plate like vertical projections for raising the pot when desired.

GEORGE G. ERDOS.